(12) United States Patent
Alvarez Raventos et al.

(10) Patent No.: US 10,996,116 B2
(45) Date of Patent: May 4, 2021

(54) METHOD FOR DETERMINING A TEMPERATURE OF A REVOLVING PART AND LAUNDRY DRYER

(71) Applicant: E.G.O. Elektro-Geraetebau GmbH, Oberderdingen (DE)

(72) Inventors: Jordi Alvarez Raventos, Oberderdingen (DE); Ewald Bayer, Dormettingen (DE); Gerd Knappe, Bretten (DE); Hannes Kuemmerle, Oberderdingen (DE); Kay Schmidt, Oberderdingen-Flehingen (DE); Erika Thomas, Balingen (DE); Steffen Weiss, Zaisenhausen (DE); Oliver Zabel, Karlsruhe (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 22 days.

(21) Appl. No.: 16/520,796

(22) Filed: Jul. 24, 2019

(65) Prior Publication Data

US 2020/0041358 A1 Feb. 6, 2020

(30) Foreign Application Priority Data

Aug. 2, 2018 (DE) ..................... 10 2018 212 940.1

(51) Int. Cl.
*G01K 11/16* (2021.01)
*F26B 11/04* (2006.01)
(Continued)

(52) U.S. Cl.
CPC .............. *G01K 11/16* (2013.01); *D06F 58/04* (2013.01); *D06F 58/16* (2013.01); *D06F 58/26* (2013.01);
(Continued)

(58) Field of Classification Search
CPC ......... G01K 11/16; D06F 58/04; D06F 58/16; D06F 58/26; D06F 2105/28; F26B 11/0445; F26B 23/04
(Continued)

(56) References Cited

U.S. PATENT DOCUMENTS 3,805,020 A  4/1974 Bates
4,206,552 A * 6/1980 Pomerantz .............. D06F 58/30
                                                34/445
(Continued)

FOREIGN PATENT DOCUMENTS

CN     108303194 A   7/2018
DE      3803597 A1   8/1989
(Continued)

OTHER PUBLICATIONS

European Search Report for European Patent Application No. 19186832.2, dated Jan. 7, 2020, (8 pages), European Patent Office, Munchen, Germany.
(Continued)

*Primary Examiner* — Stephen M Gravini
(74) *Attorney, Agent, or Firm* — Alston & Bird LLP

(57) ABSTRACT

In a method for determining a temperature of a revolving drum of a laundry dryer, said drum has an outer wall and thereon at least one strip-shaped delimited detection region comprising thermochromic material having a transition temperature in the range of a temperature that is to be expected and to be determined. Optical detection means arranged adjacent to the revolving part are configured, in particular as a reflected light barrier, to detect the color transition of the thermochromic material in the event of the transition temperature being exceeded or undershot. At the revolving drum the thermochromic material or, if appropriate, the color transition thereof is detected by means of the detection
(Continued)

means. A temperature of the drum is then determined as corresponding to the transition temperature in such a way that the temperature thereof is determined as corresponding to one of the two temperature ranges below the transition temperature or above the transition temperature.

25 Claims, 2 Drawing Sheets

(51) Int. Cl.
  F26B 23/04      (2006.01)
  D06F 58/16      (2006.01)
  D06F 58/26      (2006.01)
  D06F 58/04      (2006.01)
  D06F 105/28     (2020.01)
(52) U.S. Cl.
  CPC .......... F26B 11/0445 (2013.01); F26B 23/04 (2013.01); D06F 2105/28 (2020.02)
(58) Field of Classification Search
  USPC .......................................... 34/519, 595–610
  See application file for complete search history.

(56) References Cited

U.S. PATENT DOCUMENTS

| | | | | |
|---|---|---|---|---|
| 5,940,988 A * | 8/1999 | Eisen | .................... | D06F 43/007 |
| | | | | 34/596 |
| 7,146,749 B2 * | 12/2006 | Barron | .................... | D06F 35/00 |
| | | | | 34/596 |
| 7,681,328 B2 * | 3/2010 | DuVal | .................. | D06F 58/203 |
| | | | | 34/597 |
| 8,162,862 B2 | 4/2012 | Langen et al. | | |
| 8,528,226 B2 * | 9/2013 | Bache | ..................... | D06F 58/04 |
| | | | | 34/381 |
| 9,389,210 B2 * | 7/2016 | Ooga | .................... | G01K 11/16 |
| 9,915,023 B2 * | 3/2018 | Noh | ......................... | D06F 58/04 |
| 9,920,469 B2 * | 3/2018 | Ramprasad | ............. | D06F 58/22 |
| 10,113,263 B2 * | 10/2018 | Ashrafzadeh | ........... | D06F 58/04 |
| 10,174,452 B2 * | 1/2019 | Choi | ....................... | D06F 58/12 |
| 10,400,385 B2 * | 9/2019 | Brown | ................... | D06F 58/02 |
| 10,494,758 B2 * | 12/2019 | Prajescu | ................. | D06F 58/22 |
| 10,563,343 B2 * | 2/2020 | Chung | .................... | D06F 58/30 |
| 10,590,595 B2 * | 3/2020 | Kalze | ..................... | D06F 58/26 |
| 10,704,189 B2 * | 7/2020 | Christensen | ............ | D06F 25/00 |
| 2014/0325865 A1 * | 11/2014 | Wisherd | .............. | F26B 11/0495 |
| | | | | 34/255 |
| 2020/0041358 A1 * | 2/2020 | Alvarez Raventos | ...................... | |
| | | | | G01K 11/16 |
| 2020/0308753 A1 * | 10/2020 | Civanelli | ................ | D06F 58/30 |
| 2020/0318282 A1 * | 10/2020 | Christensen | ............ | D06F 25/00 |

FOREIGN PATENT DOCUMENTS

| | | | | |
|---|---|---|---|---|
| DE | 19537999 A1 | 4/1997 | | |
| DE | 102005025896 A1 | 11/2006 | | |
| DE | 102005031392 A1 | 1/2007 | | |
| DE | 102011102382 A1 | 1/2013 | | |
| DE | 102011108382 A1 | 1/2013 | | |
| DE | 102018212940 A1 * | 2/2020 | .......... | F26B 11/0445 |
| EP | 1888004 B1 | 4/2009 | | |
| JP | H06-194236 A | 7/1994 | | |

OTHER PUBLICATIONS

German Patent and Trademark Office, German Search Rep[ort for German Patent Application No. 102018212940.1, dated Apr. 13, 2019, (8 pages), Germany.

* cited by examiner

METHOD FOR DETERMINING A TEMPERATURE OF A REVOLVING PART AND LAUNDRY DRYER

CROSS-REFERENCE TO RELATED APPLICATIONS

This application claims priority to German Application No. 10 2018 212 940.1, filed Aug. 2, 2018, the contents of which are hereby incorporated herein in its entirety by reference.

BACKGROUND

The invention relates to a method for determining a temperature of a revolving part, in particular of a revolving or rotating drum of a laundry dryer. Furthermore, the invention relates to a laundry dryer configured to carry out this method.

In laundry dryers, the laundry is usually dried by blowing in heated air. Heat could additionally be fed to the laundry to be dried by way of heating the drum of the laundry dryer. In this case, care must then be taken, of course, to ensure that the temperature of the drum does not become too high or can be regulated.

BRIEF SUMMARY

The invention addresses the problem of providing a method mentioned in the introduction and a laundry dryer mentioned in the introduction with which problems of the prior art can be solved and it is possible, in particular, to determine a temperature of a revolving part such as, preferably, a revolving drum of a laundry dryer in a contact-free and reliable and simple manner.

This problem is solved by means of a method having the features of claim 1 and by means of a laundry dryer having the features of claim 12. Advantageous and preferred configurations of the invention are the subject matter of the further claims and are explained in greater detail below. In this case, some of the features are described only for the method or only for the laundry dryer. However, independently of that, they are intended to be able to apply both to the method and to the laundry dryer autonomously and independently of one another. The wording of the claims is incorporated by express reference in the content of the description.

Provision is made for determining the temperature of a revolving or rotating part, in particular of an abovementioned drum of a laundry dryer. However, it could also be a drum of some other part, for example also a drum of a washing machine or of a combined appliance. Consequently, provision is made, in particular, for determining a temperature of a revolving part on a domestic electrical appliance.

The part or the drum has an outer wall, on which at least one delimited detection region composed of thermochromic material or comprising thermochromic material is provided. Said detection region is advantageously delimited at least toward the side, such that it can be configured as a strip. Particularly advantageously, it is delimited on all sides, such that it can have the shape of a patch, in particular as a simple geometric shape such as a rectangle or square, possibly also as a circle. Said thermochromic material has a transition temperature lying in the range of a temperature of the revolving part that is to be expected and to be determined. In principle, the invention is essentially based on the fact that the temperature can be determined as a result of a temperature-dependent transition of the color or the surface properties of the thermochromic material. Such a transition is indeed generally known for thermochromic materials. Consequently, although an exact measurement of the temperature may possibly not be able to be effected, at least a determination of whether the temperature of the revolving part lies above or below a specific value can be effected. In this regard, it is possible to choose, in particular, a transition temperature close to or exactly at the temperature which is regarded as a maximum temperature or limit temperature for the revolving part. An exceedance can then be detected. The amount by which the temperature would then be above that or primarily the amount by which it would be below that need not necessarily be able to be detected in the case of the invention.

Provision is made of optical detection means arranged adjacent to the revolving part. Advantageously, the optical detection means are arranged near the detection region or near a path of revolution of the detection region, advantageously at a distance of less than 10 cm or even less than 3 cm. Particularly advantageously, they are arranged directly above the path of revolution of the detection region in a radial direction of the revolving part. Said optical detection means are configured to detect the transition of the color or the surface properties of the thermochromic material if the transition temperature thereof is exceeded or is undershot. A possible hysteresis regarding the temperature at this transition is fundamentally known and plays no part here or does not cause a disturbance here.

The first step implemented by the method is that the part is rotated in such a way that it revolves. In the case of a laundry dryer, therefore, the drum thereof is driven. Next, the thermochromic material is detected by means of the detection means by the detection region being moved past the detection means or at least repeatedly passing the latter during the revolution. A color transition of the thermochromic material is detected by means of the detection means if the transition temperature of said material is exceeded or is undershot. This transition is effected on account of a change in the temperature of the revolving part at least in the region of the respective detection region. Afterward, a temperature of the revolving part or at least of that region in the vicinity of the detection region is determined as corresponding to the transition temperature, depending on the exceeding or undershooting. This means that the temperature of the revolving part at least in the region of the detection region is determined as below the transition temperature if the thermochromic material undergoes a transition of its color or surface properties with the transition temperature being undershot and this transition is ascertained. Otherwise, the temperature of the revolving part is determined as above the transition temperature if the thermochromic material correspondingly changes its color or its surface properties in the event of the transition temperature being exceeded, from the bottom to the top.

It is thus possible to determine the temperature of the revolving part at least in the vicinity of the detection means in such a way that said temperature is classified as below the transition temperature or as above the transition temperature. This is completely sufficient for advantageous monitoring—mentioned in the introduction—of compliance with a maximum limit temperature. A more accurate determination in a plurality of temperature ranges can also be effected by virtue of the provision—explained in even greater detail below—of a plurality of detection regions each comprising thermochromic material at different transition temperatures.

The thermochromic material can advantageously be applied as a thermochromic ink on the detection regions or on the outer wall of the revolving part. This can be done by screen printing or the like. Alternatively, tapes or adhesive tapes can be provided with such thermochromic material and then easily be applied or adhesively bonded to the exterior. Such thermochromic materials or thermochromic inks are known for example from DE 10 2005 025 896 A1, DE 10 2005 031 392 A1 and EP 1 888 004 B1. One manufacturer is TMC Limited from Great Britain with a ChromaZone pigment.

In one advantageous configuration of the invention, detecting a transition of the color or the surface properties of the thermochromic material is carried out by means of reflection or by means of a change of reflection properties. Detection means configured particularly well for this purpose can comprise or be a reflected light barrier comprising a light source and comprising a light receiver. Light source and light receiver are configured and arranged in such a way that light emitted by the light source is reflected toward the light receiver at least at times by the thermochromic material in one of the two states below or above the transition temperature thereof, which light receiver can detect this in a known manner. In the other state, the reflected light is significantly more intense or significantly weaker.

In general, thermochromic material loses its color in the event of a transition temperature being exceeded. By means of a suitable choice of the color of a substrate for the thermochromic material, the reflection properties can thus be influenced greatly, such that for example a substrate is white or has relatively good reflectivity, whereas the thermochromic material is black or dark and, consequently, is not reflective or has only relatively poor reflectivity. In the event of the transition temperature being exceeded, the thermochromic material then becomes largely transparent or loses its color, such that the white color of the underlying substrate is manifested. While the previously black or dark color of the thermochromic material reflects only very little light or no light at all from the light source to the light receiver, the white substrate below the thermochromic material, which has then become largely transparent, reflects a large part of the emitted light. This difference can be recognized and evaluated by the light receiver in a known manner, as is known and customary for reflected light barriers.

In principle, for the configuration as a reflected light barrier, provision can also be made for the thermochromic material to have better reflection properties than a substrate on which is it applied. The reflection properties then change in exactly the opposite way to that described above, although in terms of the realization this does not pose any problem either. A significant change in the intensity of the reflected light can also be ascertained in this way.

In principle, the detection means can also be configured differently, for example as a color sensor that actually detects the color of the detection region or of the thermochromic material. This implementation also makes it possible to recognize a change in said color.

In an advantageous configuration of the invention, along the path of revolution of the detection region at the revolving part a plurality of detection regions are arranged or provided on the outer wall of the part. In this regard, a temperature can be determined not only as it were more frequently over time, but also in a manner distributed better, in order to enable a temperature determination along a plurality of, advantageously all, circumferential regions of the part. The detection regions are advantageously at an identical distance from one another, such that a regular temperature determination is possible. Furthermore, this also opens up an additional possibility, which will be explained in even greater detail below, namely that a rotational speed of the part can thus also be determined, at least when the thermochromic material is above or below its transition temperature, and is detectable by the detection means in comparison with the rest of the surface of the exterior of the revolving part. Given a known circumference of the revolving part, the rotational speed can then be determined in such a way from the temporal sequence of the signals at the detection means when the individual detection regions pass below them.

In one configuration of the invention, the plurality of detection regions comprise different thermochromic materials, each of which has a different transition temperature. A difference in the transition temperatures of these different thermochromic materials can be a maximum of 10° C., preferably a maximum of 5° C. or even only a maximum of 3° C. As a result, as it were an accuracy of the temperature detection is determinable to an accuracy of at least 10° C. or an accuracy of at least 5° C. or 3° C. Respectively three or respectively four detection regions can comprise thermochromic material having the same transition temperature. These detection regions which each have the same transition temperature or consist of the same thermochromic material are particularly advantageously distributed equally along the path of revolution. Furthermore, they are of identical size. All the detection regions can either have an identical length in the direction of revolution independently of the type of their thermochromic material. If the rotational speed of the rotating part is known, which is the case for laundry dryers, for example, since the latter usually always rotate at the same rotational speed, usually at 40 to 50 revolutions per minute, the rotational speed can be determined in a known manner by means of the detection means on the basis of the temporal changes in the reflection properties. This can then be done in a manner similar to that in the case of incremental encoders with a strip pattern.

Characteristic sections can be incorporated into the sequence of the detection regions, which characteristic sections are independent of a temperature and can be detected by the detection means. As a result, by way of example, an order of the detection regions having different transition temperatures can be determined, which can be detected by the detection means. If individual detection regions can then as it were no longer be detected by the detection means on account of passing through the transition temperature with a transition being undergone, a temperature can thus be determined. Said characteristic sections can have for example a specific length that deviates from the length of the detection regions, or specific characteristic sequences of a strip pattern in a short region. Furthermore, it is possible that along the path of revolution with the plurality of different detection regions a plurality of markings as characteristic sections mentioned above are applied with a color or a surface, which are temperature-independent, at least in the temperature range of interest here for regular operation. These markings can also be detected by the detection means, that is to say their presence. Their length should advantageously differ from that of the detection regions. Said markings should be configured to be in each case as far as possible the same or identical among one another. Since the detection means can distinguish them from the detection regions, they can also be used to accurately determine a rotational speed of the revolving part. This is then a further advantage which can be achieved with the invention because not just a current speed determination is thus possible. Even in the case of, for example, a laundry dryer having a fixedly predefined rotational speed, a mechanical problem could occur here, with the result that a drum rotates much more slowly or no longer rotates at all. Overheating of the heated region may possibly then take place, which should indeed also be avoided, independently of a temperature determination.

In another configuration of the invention, along a second separate path of revolution, which extends parallel to the path of revolution of the detection regions composed of thermochromic material or comprising thermochromic material, a plurality of markings are applied with a color or a surface, which are temperature-independent and which can be detected by the detection means. These markings, too, as explained above, are advantageously all of identical length. Thus, with said markings recognizably in a manner described above, with detection means provided for this purpose, a rotational speed of the revolving part can be determined in a simple manner. If, in this region, provision is made of no markings whatsoever with detection regions composed of thermochromic material or comprising thermochromic material, then the rotational speed can be detected particularly simply and reliably. Consequently, provision is made of a first path of revolution for determining the rotational speed, and at least one other second path of revolution for determining the temperature. These two functions are thus separate in this configuration of the invention, while they are provided jointly in one path of revolution in the configuration described above.

As has been explained above, the revolving part is advantageously heated. For this purpose, an advantageous configuration of the invention provides for corresponding heating means not to be arranged on the revolving part itself, owing to possibly difficult and costly electrical contacting therewith owing to the movement of said part. It is considered to be preferred if heating means for the revolving part heat the exterior thereof in a contact-free manner or across a certain distance, for which purpose primarily radiant heating elements or induction heating coils are suitable. The latter can also be provided at a certain distance from the part or the exterior thereof, for example 0.5 cm to 3 cm or even up to 5 cm. In this regard, an arrangement is simpler since a required accuracy need not be as high. Consequently, it is also possible to arrange the heating means rigidly and in a positionally fixed manner. Precisely for radiant heating elements, which themselves develop high temperatures of from several 100° C. to just below 1100° C. at least at the heating conductors, such a rigid arrangement is advantageous, as a result of which they can also be well insulated thermally. Radiant heating elements can radiate directly onto an exterior of the revolving part in order to heat the latter. For this purpose, the surface can be specially processed, if appropriate, in particular roughened or the like, in order that as little radiant heat as possible is reflected and as much radiant heat as possible is coupled into the part. A corresponding coating or coloration, in particular dark or as black as possible for maximally high absorption, can also be provided. Heating should then be effected over the largest possible width of the revolving part transversely with respect to the path of revolution, in order thus to enable said part to be heated over the largest possible area during revolution.

Similar principles may also apply to heating using an induction heating coil, wherein here, for coupling in the thermal energy as well as possible, an inductively heatable material should be used for the part. Alternatively, such inductively well-heatable material can be arranged on the exterior of the part, which is then indeed heated and passes on the heat inward to the revolving part itself.

Preferably, the heating means and the detection regions are configured in such a way that they do not cause a disturbance or that in plan view perpendicular to a surface of the revolving part the heating means are arranged next to the detection regions, that is to say that these are visible as it were. This also applies to the case in which the part rotates. In this regard, a temperature corruption can be reduced or even entirely avoided. Provision is thus advantageously made for a path of revolution of the detection regions, possibly also a path of revolution of abovementioned markings or characteristic sections that extends directly next to the former, to be arranged in a central region of the width of the revolving part. Heating means are then arranged alongside on the left and right. Although a plurality of heating means can be provided along the path of revolution, with appropriate design of the power of the heating means it will usually also be sufficient for only a single heating means to be arranged along the path of revolution of a region of the exterior of the part. Given a relatively low rotational speed mentioned above, this is sufficient, primarily if it is taken into consideration that a temperature of the revolving part in the case of a drum of a laundry dryer should not exceed 100° C., and is advantageously between 50° C. and a maximum of 80° C.

Provision is advantageously made for the detection regions to be heated only by transverse heat conduction of the exterior of the revolving part, rather than by the heating means directly. A temperature detection can thus be improved.

Preferably, in a laundry dryer having a drum, which can have, but need not necessarily have, a horizontal axis of rotation, the detection means and/or the heating means are arranged in the upper region. Particularly advantageously, they are arranged right at the top; as a result, problems with heat arising can also be avoided because laundry can never be left here.

Furthermore, provision is advantageously made for the heating means to be switched off during a drying process if it has been ascertained by the detection means that the drum is no longer rotating as rapidly as intended or is even no longer rotating at all, that is to say has stopped, since the detection means register a different movement or no longer register a movement at all. Specifically, overheating of the exterior of the revolving part near the heating means or directly below the heating means could otherwise take place, which should be avoided at all events.

These and further features are evident not only from the claims but also from the description and the drawings, wherein the individual features can be realized in each case by themselves or as a plurality in the form of subcombinations in an embodiment of the invention and in other fields and can constitute advantageous and inherently protectable embodiments for which protection is claimed here. The subdivision of the application into individual sections and subheadings does not restrict the statements made thereunder in terms of their general validity.

BRIEF DESCRIPTION OF THE DRAWINGS

Exemplary embodiments of the invention are illustrated schematically in the drawings and are explained in greater detail below. In the drawings.

DETAILED DESCRIPTION

Figure 1:
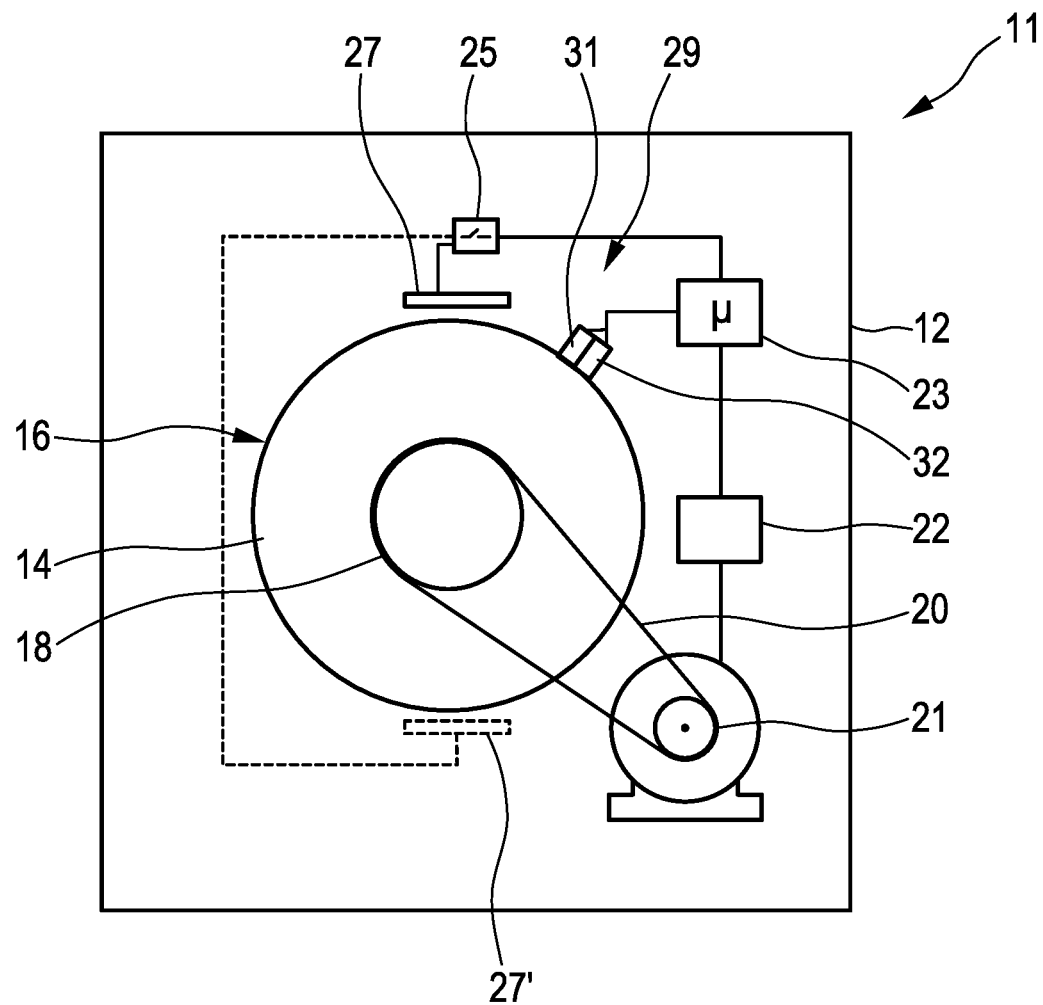
FIG. 1 shows a schematic illustration of a laundry dryer according to the invention comprising a revolving drum.

FIG. 1 illustrates a laundry dryer 11 according to the invention in a greatly simplified manner, with which laundry dryer the method according to the invention can also be carried out. The laundry dryer 11 is constructed in a manner largely as known in the prior art, comprising a housing 12 and a drum 14 together with exterior 16. The drum 14 has a projection 18 on the rear side in order to be driven or rotated by a drive rotor 21 by means of a drive belt 20. However, the drive belt 20 can also run directly on the drum 14 without a projection and can indeed partly wrap around said drum. Usually, only a single fixed rotational speed is predefined for the drum 14, advantageously at the 40 to 50 rpm mentioned above.

The laundry dryer 11 has a power supply 22 for the drive motor 21, said power supply being controlled by a controller 23 for the entire laundry dryer 11. The controller 23 furthermore also controls a power switch 25, which can be used to operate a radiant heating element 27 arranged above the drum 14. Advantageously, said element is operated clock-cyclically or continuously, in particular by being directly connected to system voltage. Radiant heating elements of this type are known from electrical hobs. They have a specific area, see also FIG. 2, on which heating conductors are laid. The latter are incandescent during operation and generate radiant heat that is then directed onto the exterior 16 of the drum 14 in order to heat the latter. An optional further radiant heating element 27' is illustrated by dashed lines below the drum 14, and can be used to heat the drum 14 even better. It is readily conceivable how a planar induction heating coil can be provided instead of the radiant heating element 27 or 27'. For said coil, the drum 14 or its exterior 16 would then have to be configured such that they can be heated inductively.

Furthermore, the controller 23 drives and evaluates a reflected light barrier 29 arranged on the right above the drum 14. The reflected light barrier 29 is substantially configured as known in the prior art comprising a transmitter 31 and a receiver 32, advantageously configured as LED and as phototransistor.

In comparison with conventional laundry dryers, the laundry dryer 11 according to the invention indeed comprises the power switch 25, the radiant heating elements 27 and the reflected light barrier 29.

Figure 2:
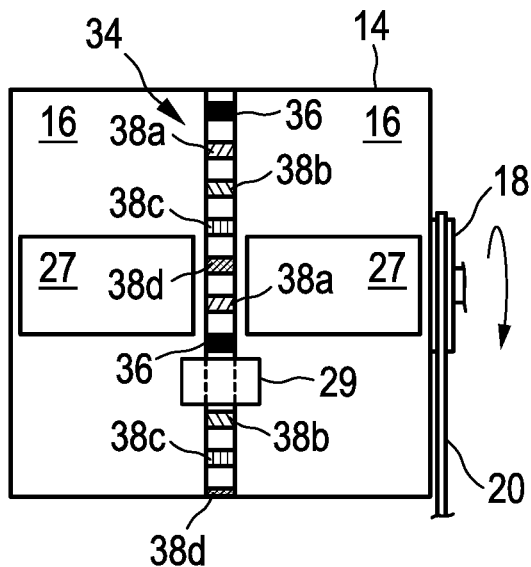
FIG. 2 shows a plan view of the drum of the laundry dryer from FIG. 1 with various detection regions, two radiant heaters and a reflected light barrier.

In addition, a measurement strip 34 is provided on the exterior 16 of the drum 14, as is illustrated in FIG. 2. The measurement strip 34 extends approximately in the center as viewed in the width of the drum 14. Two radiant heating elements 27 are provided on the left and right thereof, advantageously above the drum 14 in accordance with FIG. 1. By virtue of the central region left free, said elements do not heat directly onto the measurement strip 34 in order, as has been explained in the introduction, to influence or corrupt the temperature determination as little as possible.

The measurement strip 34 extends along the path of revolution around the entire exterior of the drum 14 as a type of ring. Along the measurement strip 34, markings 36 are provided, configured here as rectangular black areas. There are a total of four markings 36, two of which are visible. They can be formed by ink or by a corresponding sticker mentioned in the introduction. In the normal temperature range during operation of the laundry dryer 11, the markings 36 do not change their color.

In the direction of rotation along the measurement strip 34, following the marking 36, five different rectangles are arranged, which are formed in each case by different thermochromic inks, called TC inks hereinafter, that is to say as TC ink 38a, 38b, 38c, 38d and 38e. These TC inks 38a to 38e differ in their respective transition temperature. A separation between these transition temperatures can lie in the range mentioned in the introduction, and can advantageously be approximately 5° C. or 10° C. The TC ink 38a can have a transition temperature of 80° C. as maximum allowed temperature for the drum 14. The TC ink 38b can have a transition temperature of 75° C., that is to say somewhat below that. The TC ink 38c can have a transition temperature of 60° C. The TC ink 38d can have a transition temperature of 50° C., and the TC ink 38e can have a transition temperature of 40° C. This lowest transition temperature of 40° C. of the TC ink 38e serves as it were as the lowest temperature limit. It is precisely at such a low temperature that the heating of the drum is particularly advantageous since it is initially faster than the heating using air blown in that is provided anyway. Below the 40° C. mentioned, the drum 14 can be heated with maximum power, while as the temperature increases, the power must or can be decreased in order to react rapidly enough to a standstill of the drum as mentioned in the introduction. Said standstill is manifested by the signal change failing to occur.

Even if it is taken into consideration that the individual TC inks have an abovementioned hysteresis effect when passing through the transition temperatures from bottom to top or from top to bottom, a good determination of the temperature of the drum 14 or of the exterior 16 can be carried out with this temperature division. Since the drum 14 in the case of a laundry dryer 11 usually consists of high-grade steel that is relatively thin, nevertheless, in view of the large area of the radiant heating elements 27, a transverse conduction of heat is so good that the TC inks 38a to 38e on the measurement strip 34 also actually have the temperature of the wall of the drum 14 relatively accurately. With the abovementioned division of the temperatures, various temperatures that are suitable in practice for operation of a laundry dryer can be set. Although the abovementioned hysteresis of approximately 2° C. to approximately 3° C. can result in some indeterminacy in the central range, this is not harmful here. At the upper temperature range, at the latest when the TC ink 38a becomes invisible, which can be detected by means of the reflected light barrier 29, the power at the radiant heating elements 27 can be reduced or the latter are switched off entirely. The temperature will then fall again and even if the TC ink 38a does not yet become visible again at a temperature of approximately 80° C. on account of the hysteresis, it does actually become visible again at approximately 77° C. or 78° C. However, this is less important than recognizing the exceedance of the 80° C. in the upward direction.

The TC ink 38b having the transition temperature of 75° C. serves primarily to have, in the case of laundry that can be dried at a very high temperature, for example cotton, a type of regulation point below the 80° C.—to be regarded as a limit—of the TC ink 38a. At the latter, after all, switching off is effected.

Figure 3:
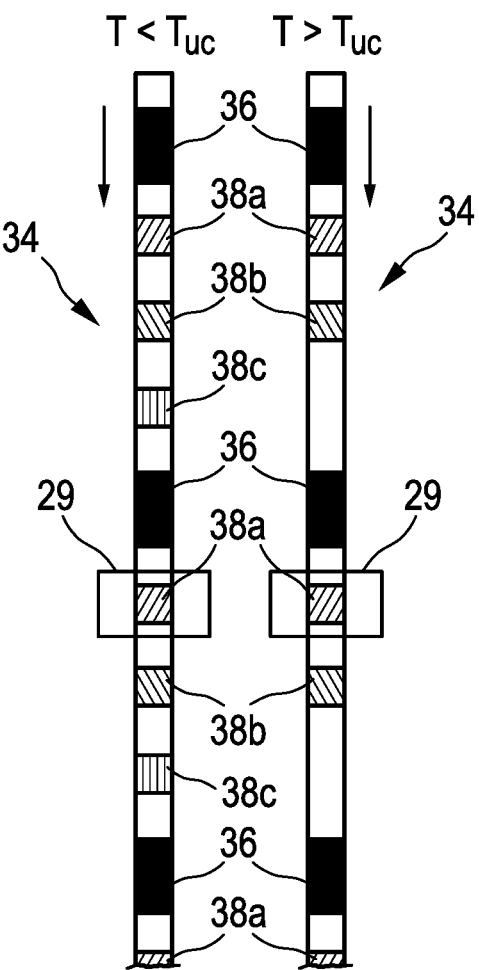
FIG. 3 shows an illustration of an unrolled measurement strip from FIG. 2 having markings and temperature-variable thermochromic inks at a temperature below a transition temperature and thereabove.

FIG. 3 illustrates two measurement strips 34, which, in a slight modification of the measurement strip from FIG. 2, comprise three TC inks 38a to 38c below the somewhat longer markings 36. Said TC inks 38a to 38c have the transition temperatures which have been mentioned with respect to FIG. 2. In the case of the left-hand measurement strip 34, a temperature is still below a transition temperature $T_{UC}$ of the TC ink 38c, which can be at 60° C. Consequently, the TC ink 38c is also visible here. With the aid of the significantly longer markings 36, the reflected light barrier 29 can detect the rotational speed of the drum 14 and primarily check whether the rotational speed is still correct. The length of the TC inks 38a to 38c is of half the magnitude and means that the latter can easily be differentiated from the marking 36.

Once the drum 14 has exceeded the transition temperature $T_{UC}$ of the TC ink 38c, that is to say is hotter than 60° C., the TC ink 38c becomes transparent or as it were invisible. Therefore, it can no longer be seen on the right-hand measurement strip 34. This is recognized by the reflected light barrier 29 since upon movement of the measurement strip 34 together with its markings and TC inks 38 downward after a marking 36 a gap follows, and the next marking 36 is detected only after two further TC inks 38b and 38a. Consequently, the temperature of the drum 14 is determined as at least 60° C., but still below 75° C.

Specifically, it is readily conceivable that in the event of the drum 14 also reaching or even exceeding a temperature above 75° C., the TC ink 38b becomes transparent, which can again be recognized by the reflected light barrier 29. If the temperature then rose even further and exceeded 80° C., the TC ink 38a would also become transparent, and the reflected light barrier 29 would then recognize only the elongate markings 36. On account of the temperature determined as too high, the radiant heating element 27 would be switched off or at least its power would be significantly reduced, switching off being preferable for safety reasons.

Furthermore, it can be envisaged that in the event of the drive motor 21 failing and the drum 14 no longer rotating in conjunction with the radiant heating element 27 being operated, the temperature rises greatly in this region of the drum 14. This also reveals an advantage of the arrangement of the radiant heating elements 27 right at the top of the drum 14, since no laundry that may then be directly damaged can actually be present here. By virtue of the great proximity of the arrangement to the reflected light barrier 29 in the vicinity, in the event of there being a TC ink 38 below the reflected light barrier 29, said TC ink would then become transparent on account of the increase, which can be detected by the reflected light barrier 29. If, for a certain time that can be predefined, for example 2 sec, the reflected light barrier then fails to detect any passage of a further TC ink 38 or of at least one of the longer markings 36, this is rated as a fault in the drive of the drum 14. The radiant heating element 27 is then immediately switched off, and a corresponding fault message can be output. The TC ink 38 need not even necessarily become transparent since a color change failing to occur at the reflected light barrier in one way or another means that the drum 14 must be either stationary or too hot. Both are equal reasons for switching off the heating.

With reference to FIG. 3, it is also readily conceivable that if the intention is to provide a temperature detection distributed better as viewed over the width of the drum 14 in accordance with FIG. 2, two or even more of such measurement strips 34 can be provided. In a similar form, provision can also be made for providing a pure measurement strip 34 only having TC inks having different transition temperatures. Relatively close to that, provision is made of a further measurement strip only having markings for determining the rotational speed of the drum 14.

In actual fact only one measurement strip 34 having TC inks 38 is required for a safety shutdown of the heating. Both an excessively high temperature and a standstill of the drum 14 would cause the change to fail to occur and can then serve for switching off the heating.

The invention claimed is:

1. A method for determining a temperature of a revolving part, said method comprising the steps of:
   providing a revolving part, the revolving part comprising:
     an outer wall,
     on said outer wall at least one delimited detection region being composed of thermochromic material or comprising thermochromic material, wherein said thermochromic material has a transition temperature in a temperature range of a temperature of said revolving part that is to be expected and to be determined, and
     optical detection means arranged adjacent to said revolving part and configured to detect a color transition of said thermochromic material in an event of said transition temperature being exceeded or undershot,
   rotating said revolving part in such a way that said revolving part revolves,
   detecting said thermochromic material by means of said optical detection means,
   detecting a color transition of said thermochromic material by means of said optical detection means, and
   determining a temperature of said revolving part as corresponding to said transition temperature in such a way that said temperature of said revolving part is determined as corresponding to one of two temperature ranges being below said transition temperature or being above said transition temperature.

2. The method according to claim 1, wherein said revolving part is a rotating drum of a laundry dryer.

3. The method according to claim 1, wherein detecting a color transition of said thermochromic material is carried out by means of reflection, wherein for said detecting the detection means are configured as a reflected light barrier comprising a light source and a light receiver, said light source and said light receiver are configured and arranged in such a way that light emitted by said light source is reflected toward said light receiver at least at times by said thermochromic material in one of two states thereof.

4. The method according to claim 1, wherein along a path of revolution of said detection region at said revolving part a plurality of detection regions are arranged on said outer wall of said part.

5. The method according to claim 4, wherein said plurality of detection regions comprise different thermochromic materials, each of which detection regions has a different transition temperature.

6. The method according to claim 5, wherein a difference in said transition temperature of said different thermochromic materials is a maximum of 10° C.

7. The method according to claim 4, wherein three or four detection regions respectively comprise thermochromic material having a same transition temperature.

8. The method according to claim 4, wherein along said path of revolution with said detection regions a plurality of markings are applied with a color or a surface, which markings are temperature-independent and which markings are detectable by said detection means.

9. The method according to claim 8, wherein a length of said markings along said path of revolution is different from a length of said detection regions.

10. The method according to claim 8, wherein all said markings along said path of revolution are of identical length.

11. The method according to claim 4, wherein along a path of revolution being parallel to said path of revolution of said detection regions composed of thermochromic material or comprising thermochromic material, a plurality of said markings are applied with a color or a surface, which color or a surface are detectable by detection means.

12. A laundry dryer comprising:
a revolving part as a rotating drum having an outer wall having thereon at least one delimited detection region composed of thermochromic material or comprising thermochromic material, said thermochromic material having a transition temperature in a temperature range of a temperature of said revolving part that is to be expected and to be determined,
a controller configured for rotating said revolving part in such a way that said revolving part revolves, and
optical detection means arranged adjacent to said revolving part and configured, via said controller, to detect said thermochromic material and to detect a color transition of said thermochromic material in an event of said transition temperature being exceeded or undershot,
wherein said controller is configured for determining a temperature of said revolving part as corresponding to said detected transition temperature, such that said temperature of said revolving part is determined as corresponding to one of two temperature ranges being below said transition temperature or being above said transition temperature.

13. The laundry dryer according to claim 12, wherein along a path of revolution of said detection region at said rotating drum a plurality of detection regions are arranged on said outer wall of said drum.

14. The laundry dryer according to claim 13, wherein said plurality of detection regions are at an identical distance from one another.

15. The laundry dryer according to claim 13, wherein said plurality of detection regions comprise different thermochromic materials, each of which thermochromic materials has a different transition temperature.

16. The laundry dryer according to claim 15, wherein a difference in said transition temperature of said different thermochromic materials is a maximum of 10° C.

17. The laundry dryer according to claim 13, wherein three or four said detection regions respectively comprise thermochromic material having a common transition temperature.

18. The laundry dryer according to claim 17, wherein said three or four detection regions are equally distributed along said path of revolution.

19. The laundry dryer according to claim 13, wherein along said path of revolution with said detection regions a plurality of markings are applied with a color or a surface, which markings are temperature-independent and which markings are detectable by said detection means.

20. The laundry dryer according to claim 19, wherein a length of said plurality of markings along said path of revolution is different from a length of said detection regions.

21. The laundry dryer according to claim 19, wherein all said plurality of markings along said path of revolution are of identical length.

22. The laundry dryer according to claim 19, wherein along a path of revolution that is parallel to said path of revolution of said detection regions composed of thermochromic material or comprising thermochromic material, said Rail plurality of said markings are applied with a color or a surface, which color or surface are detectable by detection means.

23. The laundry dryer according to claim 22, wherein no detection region composed of thermochromic material or comprising thermochromic material is provided along a path of revolution with said markings.

24. The laundry dryer according to claim 12, wherein heating means for said rotating drum are provided for heating an exterior of said drum, wherein said heating means are not secured to said rotating drum itself and, consequently, are arranged rigidly or do not revolve.

25. The laundry dryer according to claim 24, wherein said heating means on a left and a right alongside said path of revolution of said detection regions, wherein said heating means are arranged on said left and said right alongside said path of revolution of said detection regions in such a way that said heating effect does not directly affect said paths of revolution.

* * * * *